M. H. TARBOX.
SHEAVES FOR PULLEY-BLOCKS.

No. 173,143. Patented Feb. 8, 1876.

Witnesses:
Donw Twitchell.
Will H. Dodge.

Inventor:
M. H. Tarbox,
by Dodge & Son,
Attys.

UNITED STATES PATENT OFFICE.

MYRON H. TARBOX, OF LOCKPORT, NEW YORK.

IMPROVEMENT IN SHEAVES FOR PULLEY-BLOCKS.

Specification forming part of Letters Patent No. 173,143, dated February 8, 1876; application filed January 22, 1876.

*To all whom it may concern:*

Be it known that I, MYRON H. TARBOX, of Lockport, in the county of Niagara and State of New York, have invented certain Improvements in Sheaves for Pulley-Blocks, of which the following is a specification:

This invention consists of a sheave for pulley-blocks, having its rim constructed so as to be thickest and strongest at its center, and having its spokes or arms arranged alternately on opposite sides of the center, and being made widest on their inner faces, all as hereinafter more fully set forth.

Figure 1:
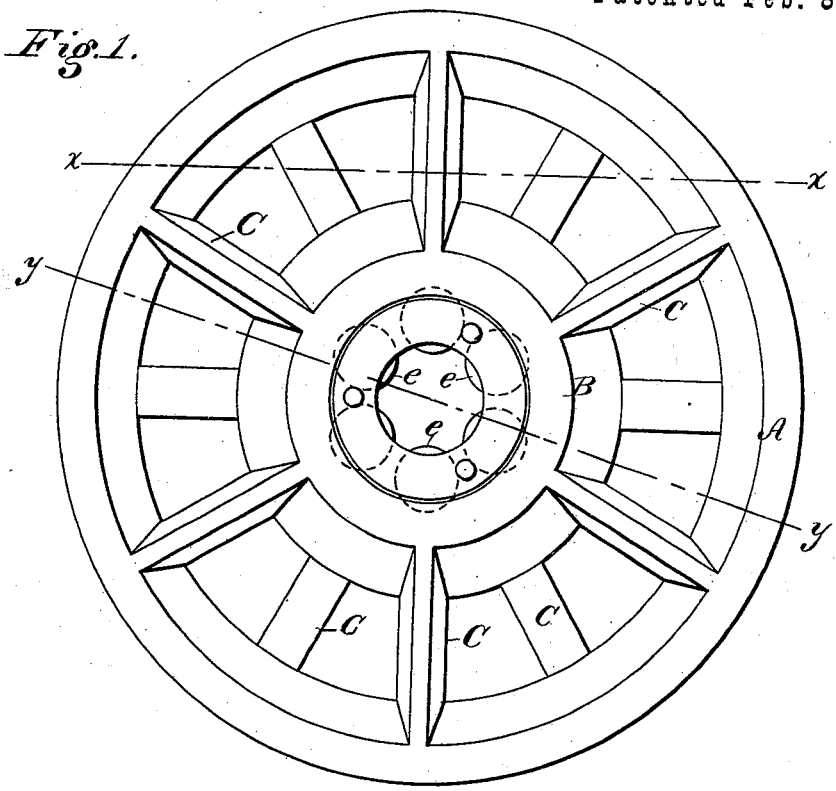
Figure 2:
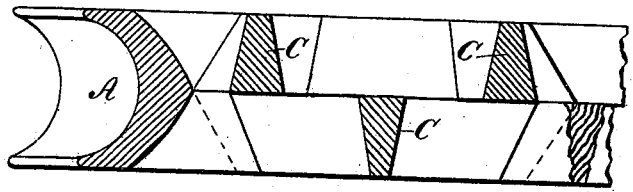

Figure 1 is a side elevation of the sheave complete. Fig. 2 is a cross-section on the line $x\,x$ of Fig. 2, and Fig. 3 is a transverse section on the line $y\,y$ of Fig. 1.

In constructing sheaves of this class heretofore it has been customary to make them with spokes as wide as the rim, or nearly so, and of a uniform thickness their entire width, and also to make the rim thinner at its center than at its sides or edges, the result of which is that they often break and are rendered useless, or liable to become so at any time. It is to remedy these defects and produce a better and more reliable article that this invention is designed.

Figure 3:
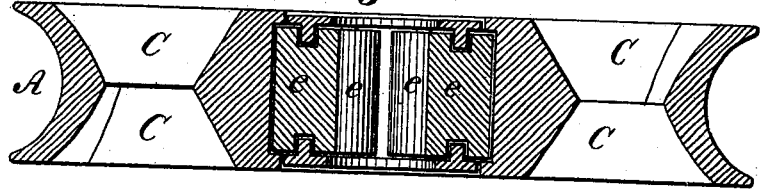

To do this the rim A is so constructed as to be thicker at its center than at any other point, as shown in Figs. 2 and 3. The hub and rim are both V-shaped on their adjoining faces, as shown in Fig. 3, and the spokes C are arranged in two tiers or sets, one on each side of the center, as shown in the several figures. These spokes C are also made widest on their inner faces, thus making them partially V-shaped in cross-section, as shown in Fig. 2, whereby they are rendered stronger at the center of the wheel, the point where the greatest strain comes, in use. Instead of being arranged in pairs opposite each other, they set so as to alternate first on one side and then on the other, as shown in Figs. 1 and 2. By this arrangement of the spokes the rim is supported at double the number of points, without any increase of metal, that it would be with the spokes made on the old plan, in which they extended entirely across from side to side of the rim and hub, there being usually six spokes, whereas in this there are twelve. It will, therefore, be seen that by this construction the sheave or pulley is rendered much stronger, with but little or no increase of metal, and that, consequently, it is far less liable to be broken or injured by use.

Having thus described my invention, what I claim is—

1. A sheave or pulley for pulley-blocks having its rim made thicker at its center than at its sides or edges, substantially as set forth.

2. The spokes C, arranged alternately on opposite sides, substantially as shown and described.

3. The spokes C, made V-shaped in cross-section, and arranged with their widest face at the center, substantially as and for the purpose set forth.

MYRON H. TARBOX.

Witnesses:
JESSE PETERSON,
JOHN J. POWERS.